United States Patent [19]

Zanchi et al.

[11] 4,365,291

[45] Dec. 21, 1982

[54] SYSTEM FOR BIDIRECTIONAL TRANSMISSION OF INTERLOCKED SIGNALS

[75] Inventors: Vittorio Zanchi, Milan; Tiziano Maccianti, Pregnana Milanese, both of Italy

[73] Assignee: Honeywell Information Systems Italia, Milan, Italy

[21] Appl. No.: 35,861

[22] Filed: May 3, 1979

[30] Foreign Application Priority Data

May 5, 1978 [IT] Italy .............................. 23037 A/78

[51] Int. Cl.³ .......................................... G06F 13/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,993,981 | 11/1976 | Cassarino, Jr. et al. | 364/200 |
| 4,047,246 | 9/1977 | Kerllenevich et al. | 364/200 |
| 4,067,059 | 1/1978 | Derchak | 364/200 |
| 4,120,028 | 10/1978 | Membrino et al. | 364/200 |

Primary Examiner—Gareth D. Shaw
Assistant Examiner—David Y. Eng
Attorney, Agent, or Firm—Lewis P. Elbinger

[57] ABSTRACT

A system comprising interface circuits for coupling together for bidirectional information communication the various units of a data processing system, wherein such communication is effected by a totally interlocked bidirectional dialogue carried out over a single lead, but utilizing signals transmitted on another lead of the interface for clearing the interface circuits associated with the single lead.

2 Claims, 3 Drawing Figures

SYSTEM FOR BIDIRECTIONAL TRANSMISSION OF INTERLOCKED SIGNALS

BACKGROUND OF THE INVENTION

The subject invention pertains to data processing systems, and more specifically to the communication channels, or interfaces, which couple together the various system components. As is known in the art data processing systems are composed of several units each having a specific function, such as a central processor, a working memory, and peripheral devices, connected to each other by means of a set of leads over which a complex system of electrical signals is transferred. A specific meaning and function is attributed to each signal, depending upon the particular lead used for its transmission. The set of these leads and signals, together with the set of electrical, logical, and procedural characteristics adhered to by these signals, is called a connection interface.

These interfaces comprise a considerable number of leads, posing serious problems of space and cost, due to both the dimensions and cost of the cables themselves, and to the dimensions and cost of the lead terminations; i.e. of the connectors and of the electrical control circuits.

For a long period attempts have been made to remedy these disadvantages by means of many different solutions.

For example, a circuit for the bidirectional transmission of interlocked signals has been disclosed in the Italian patent application 21510A/78, filed by the assignee of the instant application, and the corresponding U.S. patent application Ser. No. 023,050, filed Mar. 22, 1979. Such circuit uses a single lead to transfer a signal in one direction and a response signal in the opposite direction. A first embodiment of the above mentioned bidirectional transmission circuit enables the execution of a dialogue, which may be considered as being totally interlocked, and therefore especially reliable from a functional standpoint. However, such embodiment is relatively complex, inasmuch as it requires the transmission on the line of four distinct leading edges in order for the dialogue to be completed.

In a second embodiment of the above-mentioned circuit, the dialogue is simplified because it is executed by the transmission along the line of only two leading edges.

However, the latter dialogue is only partially interlocked, and at least one of the two interconnected units must provide an autonomous resetting means in order to reset the entire transmission circuit to its initial condition.

Such resetting means utilizes a delay line, and, therefore, has the disadvantage that the duration of the resetting operation is fixed. Thus, the duration of the resetting operation cannot be modified or optimized according to the length of the connection between two interconnected units. Furthermore, the device which is autonomously reset does not provide to the other device any information whatsoever for use by the latter to recognize the status, and possibly the resetting of the former.

SUMMARY OF THE INVENTION

Accordingly, it is an object of the subject invention to provide an alternative and improved interface circuit. This invention overcomes all the above mentioned disadvantages by providing a totally interlocked, bidirectional dialogue over a single lead, utilizing signals applied to other leads of the interface for clearing or initializing the circuits associated with said lead.

These and other leads are preferably communication leads already available in the interface for the transfer of other signals, so that generally the need of an additional communication lead is avoided.

Another object of the subject invention is to provide an improved interface circuit providing interlocked bidirectional dialogue on a single lead for use by a plurality of data processing units which may concurrently request access to a single storage unit.

BRIEF DESCRIPTION OF THE DRAWING

The invention will be described with reference to the accompanying drawings, wherein.

DESCRIPTION OF THE PREFERRED EMBODIMENT

Figure 1A:
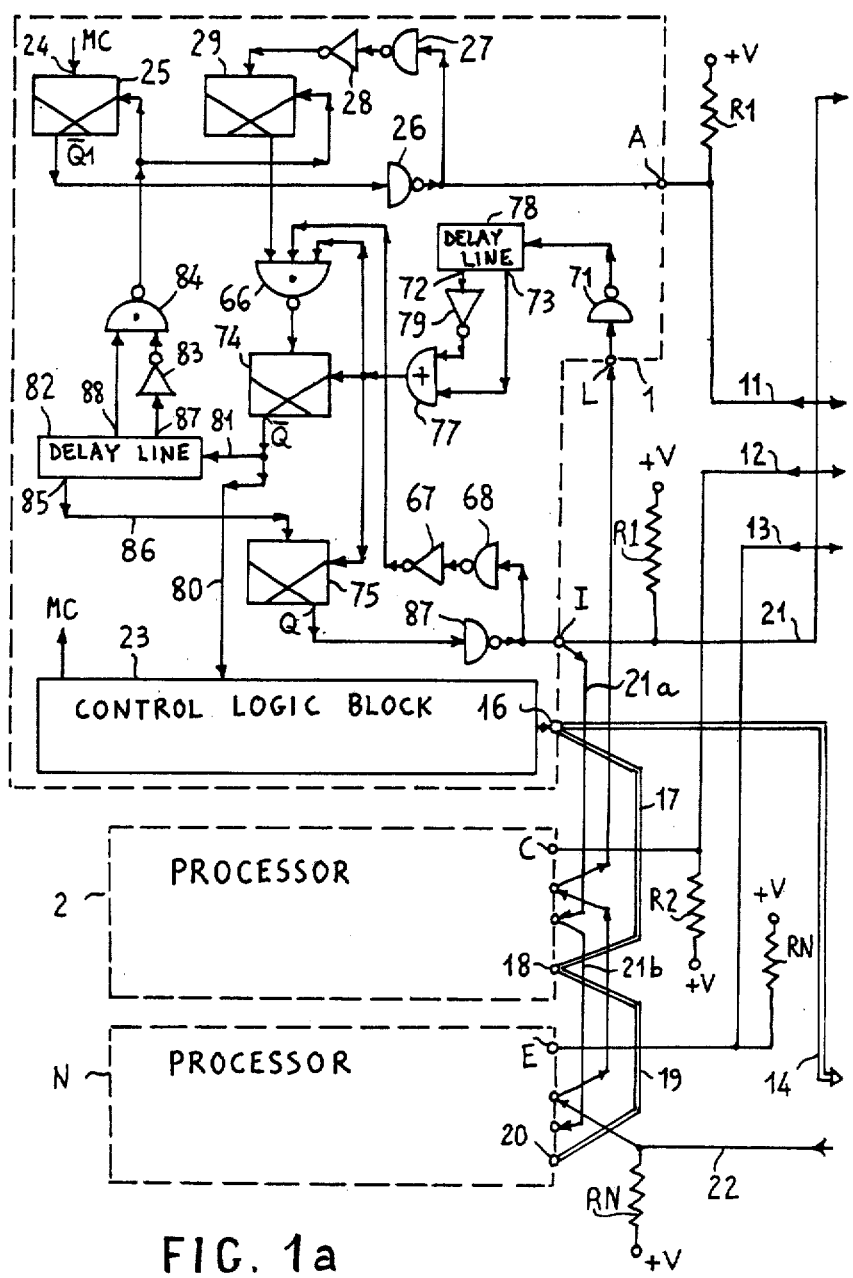
FIGS. 1a and 1b, together, are a diagram of a system of interconnecting a plurality of data processing units and a single memory unit, according to the subject invention.
Figure 1B:
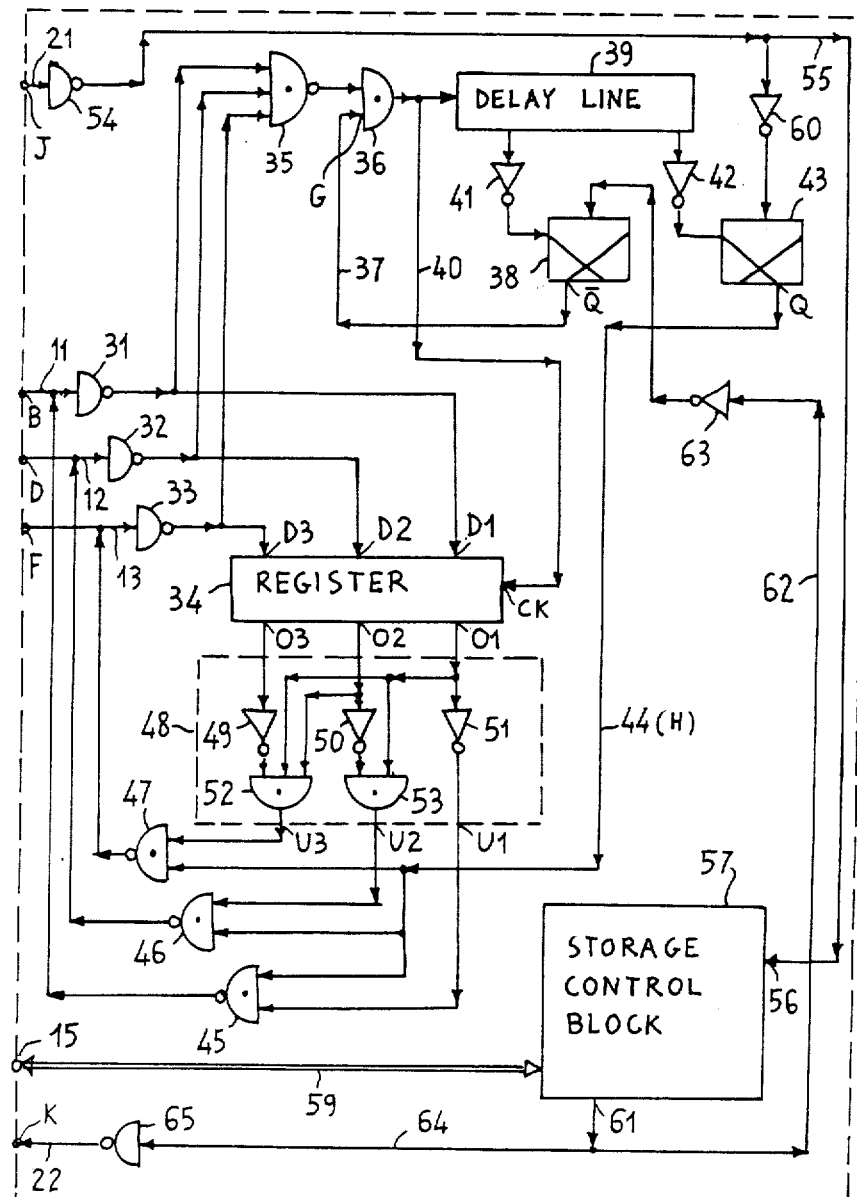

The interconnection system, or interface, of FIGS. 1a and 1b performs an interlocked dialogue which, according to the subject invention, takes place on bidirectional communication leads. For a complete representation of the system of FIGS. 1a and 1b, FIG. 1b should be placed to the right of FIG. 1a.

Dotted block 1 represents a first data processing unit, dotted block 2 represents a second data processing unit, and dotted block N represents an n-th data processing unit.

Dotted block 4 represents a memory unit.

The units 1, 2, N, 4, together, form what is called a multiprocessor data processing system, because it includes several, autonomous data processing units 1, 2 and N.

Although not shown, these units may connect to input/output peripheral devices, such as printers, card or paper tape readers, card punches, etc.

During various data processing phases, data processing units, or processors, 1,2,N may request access to memory unit 4 in order to read information stored therein, or to write thereinto other information.

Memory unit 4 cannot respond to several concurrent access requests, nor can it respond to an access request until a previous operation is completed.

Because of this, the memory unit is provided with a priority allocation network. Any access to the memory unit must be initiated with an interlocked dialogue.

This process begins with an access request by a processor, is followed by an acknowledgment by the memory unit, transmitted according to established priorities and upon completion of previous memory access operations, and is concluded by the actual execution of the requested memory access operation.

In order to send a request for access to memory, processor 1 is connected to memory unit 4 by a lead 11, processor 2 is connected to memory unit 4 by a lead 12, and processor N is connected to the memory unit 4 by a lead 13. These leads are coupled to a positive voltage source +V through respective resistors R1, R2, and RN. Leads 11, 12 and 13 are used both to transmit access request signals to and to receive acknowledgment signals from the memory unit 4.

The dialogue mechanism is identical to that described in the above-mentioned patent application, i.e., leads 11, 12, and 13 are normally grounded by means of appropriate interface circuits at their processor ends.

When a processor sends a request signal for access to the memory, this ground connection is opened and the related lead (11, 12, or 13) rises to the voltage level +V.

When memory unit 4 answers, acknowledging the request, the related lead (11, 12, or 13) becomes grounded by means of interface circuits at their memory unit ends. When a lead is so restored to the ground level, the processor connected to such lead interprets this action as an acknowledgment of its request for access. In this respect, the subject invention does not differ from that disclosed in the above-mentioned patent application; however, it differs in the manner in which the interface circuits in the memory unit are cleared.

Processors 1, 2, and N also communicate with memory unit 4 by means of a set of leads 14, also known as a data and control bus.

The data and control bus 14 forms a so called "daisy chain" connection, wherein bus 14 is connected to memory unit 4 by means of a set of lead terminations 15, and to processor 1 by means of a set of termination pins 16.

Pins 16 are connected to a set of connection pins 18 of processor 2 by means of a set of connection leads 17; in turn, connection pins 18 are connected to a set of connection pins 20 of processor N by means of a set of connection leads 19. In this manner, the corresponding areas of connection pins 16, 18 and 20 of the various processors are all connected to data and control bus 14.

This data and control bus may include leads to transmit information signals to the memory, and leads to receive information signals from the memory.

Alternatively, or in addition, bus 14 may include bidirectional leads to send or receive signals representing binary information to/from the memory.

Processors 1, 2 and N also communicate with memory unit 4 by means of a control and timing lead 21, used to transmit to the memory unit a control and timing signal.

The connection between processors 1, 2, N, and the memory unit 4, by means of lead 21, is also of the "daisy chain" type; a single lead 21 connects the memory unit with processor 1, which in turn, is connected to processor 2 by means of the lead, or bridge, 21a, and processor 2, in turn, is connected to processor N by means of lead, or bridge, 21b. Memory unit 4 also communicates with processors 1, 2, and N by means of a lead 22, used to transmit a timing signal to the processors.

This connection between memory unit 4 and the processors, by means of lead 22, is also of the "daisy chain" type.

The interface circuits of processor 1 comprise a control logic block 23.

Although logic block 23 may be microprogrammed, it is not shown in detail because it is not necessary for an understanding of the subject invention. When the processor requires to initiate access to memory unit 4, logic block 23 generates a microcommand signal MC at the binary 0 level.

The microcommand signal MC is applied to the clock input terminal 24 of a flip-flop 25, which is normally in the reset, or binary 0 state, and transfers it to the set, or binary 1, state. Flip-flop 25 is a flip-flop of the type which is triggered by the trailing edge of a binary 1 signal applied to the clock input terminal.

The Q1 output terminal of flip-flop 25 is connected to the input terminal of an inverter/driver 26 of the "open-collector" type. The output terminal of inverter 26 is connected to interface lead 11, which transmits to memory unit 4 the access request signals issued by processor 1.

Therefore, when flip-flop 25 is transferred to the set state, the signal present on the Q1 output terminal falls to the binary 0 level, and the output terminal of inverter 26 opens the ground connection to its output terminal, raising the voltage applied to lead 11 to the +V level, through the resistor R1, which level corresponds to the binary 1 level.

The output terminal of inverter 26 is connected to the input terminal of an inverter/receiver 27. The output terminal of inverter 27 is connected to the input terminal of a second inverter 28. The output terminal of inverter 28 is connected to the clock input terminal of a flip-flop 29, which is also of the type triggered by trailing edge of a binary signal.

Therefore, when the signal on lead 11 rises to the binary 1 level and the signal applied to the clock input terminal of flip-flop 29 also rises to the binary 1 level, but this signal change has no effect on flip-flop 29.

Although not illustrated, processors 2, N, will comprise interface circuits, similar to those described above for controlling the signals on leads 12 and 13.

Lead 11 is connected to the input terminal of a receiver/inverter 31, lead 12 is connected to the input terminal of a receiver/inverter 32 and lead 13 is connected to the input terminal of a receiver/inverter 33.

The output terminals of receivers 31, 32, and 33 of the interface circuits of memory unit 4 are connected to respective input terminals of a NAND gate 35, and to respective data input terminals D1, D2, D3, of a register 34.

The output terminal of NAND gate 35 is connected to one input terminal of a two-input AND gate 36.

Through lead 37, AND gate 36 receives at its second input terminal an enabling signal coming from the Q, or binary 0, output terminal of a flip-flop 38. The output terminal of AND gate 36 is connected to the input terminal of a tapped delay line 39, and to the clock input terminal CK of register 34 by means of a lead 40.

A first output tap of delay line 39 is connected to the input terminal of an inverter 41, whose output terminal is connected to the set input of flip-flop 38.

A second output tap of delay line 39 is connected to the input terminal of an inverter 42, whose output terminal is connected to the set input terminal of a flip-flop 43.

The direct, or binary 1, output terminal of flip-flop 43 is connected through a lead 44 to an enabling input terminal of three NAND inverter/driver gates 45, 46 and 47.

The output terminals of inverter/driver gates 45, 46 and 47 is connected to leads 11, 12, and 13, respectively.

The signals input terminals of inverter/driver gates 45, 46, and 47 are connected, respectively, to output terminals U1, U2, and U3 of a logical exclusion matrix, or priority network, 48. The output terminals 01, 02, and 03 of register 34 are connected to the input terminals of priority network 48.

Priority network 48 comprises three inverters 49, 50, 51, and two AND gates 52, and 53, the latter gates having three and two input terminals, respectively.

The output terminal O1 of register 34 is coupled to output terminal U1 of network 48 through the inverter 51. Output terminal O1 is also connected to one input terminal of each of AND gates 52 and 53.

Through inverter 50, output terminal O2 of register 34 is coupled to a second input terminal of AND gate 53, whose output signal is applied to the signal input terminal of inverter/driver gate 46. The O2 output terminal is also connected to a second input terminal of AND gate 52.

Output terminal O3 of register 34 is coupled to a third input terminal of AND gate 52 through inverter 49. The function of priority network 48 is to assign relative priorities to the requests for memory access received from the various processors over leads 11, 12, 13, and to select the highest priority request when more than one occurs at the same time.

For example, priority network 48 accords highest priority to the requests coming from processor 1 over lead 11, intermediate priority to the requests coming from processor 2 over lead 12, and the lowest priority to the requests coming from processor N over lead 13. Thus, a signal at the binary 0 level, at the terminal O1 is transferred to output terminal U1, where it appears in inverted form due to inverter 51, i.e. as a signal at the binary 1 level, without any enabling gating whatsoever. On the contrary, a signal at the binary 0 level at the terminal O2 is transferred to output terminal U2 only if, at the same time, a signal at the binary 1 level is present at the terminal O1, signifying that no higher priority request is pending.

Similarly, a signal at the binary 0 level, at the terminal O3 is transferred to output terminal U3 only if, at the same time, signals at the binary 1 level are concurrently present at both terminals O2 and O1.

The output terminals O1, O2, and O3 are the output terminals of the cells of register 34, and correspond to the respective input terminals D1, D2, and D3 of register 34.

The purpose of these cells is to store, as information at the binary 0 level, signals representing the requests for access received through leads 11, 12, and 13.

In operation, when a processor, for example processor 2, requires access to the memory, it raises the signal present on lead 12 to the binary 1 level.

Accordingly, the output signal of the inverter 32 falls to the binary 0 level, and the output signal of NAND gate 35 rises to the binary 1 level.

If flip-flop 38 is in a reset, or binary 0, state, which signifies that there are no memory cycles in process, AND gate 36 is enabled, whereby the binary 1 output signal of NAND gate 35 is transferred through AND gate 36 and over lead 40 to trigger register 34 to store the signals applied to its input terminals D1, D2 and D3. Therefore, the binary 0 signal, present at the output terminal of the inverter 32, is loaded into register 34, along with the signals present at the output terminals of the other inverters 31 and 33. At the same time, the binary 1 signal, present at the output terminal of AND gate 36, is applied to delay line 39 and propagates to the several output taps thereof.

When this binary 1 signal reaches the first tap, the output signal of inverter 41 falls to the binary 0 level, and flip-flop 38 is set, flip-flop 38 being of the type which is set whenever a binary 0 signal is applied to its set input terminal.

Therefore, the signal at output terminal Q of flip-flop 38 now falls to the binary 0 level, inhibiting AND gate 36. As a consequence, no further access request signal is transferred to the output terminal of AND gate 36, and, accordingly, is effective until the flip-flop 38 is reset.

When the binary 1 signal propagating along the delay line 39 reaches the second output tap, the output signal of inverter 42 falls to the binary 0 level, and flip-flop 43 is also set. The binary 1 output signal Q of flip-flop 43 now rises to the binary 1 level, thus enabling NAND gates 45, 46, and 47.

Meantime, the highest priority access request among the request representative entered into register 34 has been delivered at an output terminal of the priority network 48 as a binary 1 signal. Assume that a binary 1 signal is present at the U2 output terminal. The output signal of the NAND gate 46, which is of the open collector type, now falls to the binary 0 level.

This change in the output signal of NAND gate 46 causes the level of the signal present on lead 12 to fall to the binary 0 level, thereby representing an answer and acceptance of the submitted access request. At this point in time flip-flops 38 and 43 are in the set state.

However, when the processor whose request has been accepted receives an acceptance answer, it transfers the signal present on lead 21 to the binary 0 level, thereby indicating that it is actually accessing the memory.

In the following description, the signal on lead 21 will be called the PROCOL signal, that is PROcessor COntrol signal.

This binary 0 signal now present on lead 21 is received by the memory through an inverter/receiver 54, whose output signal rises to the binary 1 level.

The output signal of the inverter/receiver 54 is transmitted over a lead 55 to input terminal 56 of a logical storage control block 57, thereby activating control block 57.

Block 57 is not shown in detail, because it is not pertinent to the subject invention and a description thereof is not needed for an understanding of the invention.

Through the terminals 15 and a channel 59, block 57 also receives a set of information signals representing commands (for example, read, write, diagnostic test), storage addresses, and data to be written into the memory.

Channel 59 also includes leads for transmitting to the processor, at its request, signals representing the status of the storage and of the data read from the memory.

The output signal of receiver/inverter 54 is also applied to the clock input terminal of flip-flop 43 through an inverter 60. Therefore, as soon as the PROCOL signal falls to the binary 0 level, the output signal of inverter 60 falls to the binary 0 level and flip-flop 43 is reset.

As a consequence, the binary 1 output signal Q of flip-flop 43 falls to the binary 0 level and NAND gates 45, 46, and 47 become inhibited. Thus, their output terminals become actually ground-disconnected, as NAND gates 45, 46 and 47 return to their normal rest status. At the conclusion of the memory cycle, or rather, slightly before such conclusion (for reasons to be explained hereafter), control block 57 issues a cycle and signal, designated $\overline{ENCY}$, at the binary 1 level, on an output lead 61.

This signal, applied to the clock input terminal of flip-flop 38 through a lead 62 and on inverter 63, resets flip-flop 63, thus enabling the transfer through the AND gate 36 of new or pending access request signals.

The signal $\overline{ENCY}$ is delivered to lead 22, through a lead 64 and an inverter/driver 65, in non inverted form, and is designated ENCY. Lead 22 transmits the signal ENCY to the various processors 1, 2, and N.

The signal ENCY correspondingly remains at the binary 0 level until the memory cycle is completed and it returns to the binary 1 level when the memory is ready to start a new cycle.

As has been described above, flip-flop 25, FIG. 1a, is set by a microcommand signal MC, to initiate a memory access request.

This causes the signal present on lead 11 to rise to the binary 1 level. When the request represented by this signal is acknowledged, the binary level of the signal on the lead 11 falls to the 0 state (because of the action of NAND gate 45, FIG. 1b) which causes a flip-flop 29 to be set.

The Q output terminal of flip-flop 29 is connected to one input terminal of a three-input NAND gate 66.

NAND gate 66 receives at a second input terminal thereof the signal present on lead 21, through an inverter 67 and an inverter/receiver 68 connected in series.

In the quiescent state, i.e. if no processor has started any memory access operation, this signal on lead 21 is at the binary 1 level.

NAND gate 66 receives at its third input terminal the signal which is present at the output terminal of a two input OR gate 77. OR gate 77 with a delay line 78 and an inverter 79 forms a pulse generator.

The input terminal of delay line 78 receives the signal ENCY present on lead 22 through an inverter/receiver 71. The signal ENCY is normally at the binary 1 level and, accordingly, the output signals at the taps 72 and 73 of delay line 78 are normally at the binary 0 level. The tap 72 is connected to the input terminal of inverter 79, whose output terminal is connected to an input terminal of OR gate 77.

The tap 73 is directly connected to a second input terminal of OR gate 77.

Therefore, in the quiescent state the output signal of OR gate 77 is at the binary 1 level. Only after the ENCY signal on lead 22 rises back to the binary 1 level, after having been lowered to the binary 0 level, does a short pulse at the binary 0 level appear at the output terminal of OR gate 77.

The duration of this pulse equals the propagation time of the signal trailing edge, from tap 73 to tap 72.

The output terminal of the OR gate 77 is connected to the reset input terminals of flip-flops 74 and 75, and to one input terminal of NAND gate 66.

The output terminal of NAND gate 66 is connected to the clock input terminal of flip-flop 74.

If no previously requested memory access operations are being executed, as soon as the flip-flop 29 is set, the output signal of NAND gate 66 falls to the binary 0 level, setting flip-flop 74. However, if previous memory access operations are being executed, the signal issued by the flip-flop 29 is not immediately effective to set flip-flop 74. This is because, as will be described later, the output signal of inverter 67 or the output signal of OR gate 77 may be at the binary 0 level, thereby suspending the effectiveness of the signal of flip-flop 29 until both such output signals are at the binary 1 level.

Assume, now, that flip-flop 74 has been set.

Therefore the output signal Q of flip-flop 74 falls to the binary 0 level.

The output signal $\overline{Q}$ of flip-flop 74 is transmitted to control logic block 23 of processor 1 over a lead 80. The falling to the binary 0 level by such signal $\overline{Q}$ represents to control logic block 23 that a memory cycle, assigned to processor 1, can be initiated.

Therefore, the control logic block 23 can now initiate the appropriate operations, such as loading the proper commands a preset memory address, and, where required, information to be written into the memory, into proper interface registers, whose output terminals are connected to the set of termination pins 16, connected to bus 14. The output signal $\overline{Q}$ of flip-flop 74 is also applied to the input terminal of a delay line 82, through a lead 81.

Delay line 82, similarly to delay line 78, with an inverter 83 and a NAND gate 84, forms a pulse generator. Delay line 82 has three intermediate taps, 87, 88, and 85 in order along the delay line.

The first tap 87 is connected to the input terminal of inverter 83, whose output terminal is connected to one input terminal of NAND gate 84. The second tap 88 is directly connected to a second input terminal of NAND gate 84.

The third tap 85 is directly connected to the clock input terminal of flip-flop 75.

The output terminal of NAND gate 84 is connected to the reset input terminals of the two flip-flops 25 and 29.

Normally the output signal of NAND gate 84 is at the binary 1 level, as is the signal applied to the clock input terminal of flip-flop 75.

However, when flip-flop 74 is transferred to the binary 1 state, the signal applied to lead 81 falls to the binary 0 level.

For a certain interval, after the binary level of the signal present at tap 87 has fallen to 0, and while a binary 1 signal is still present at tap 88, a binary 0 pulse appears at the output terminal of NAND gate 84. Such pulse ends when the signal at tap 88 of the delay line falls to the binary 0 level.

The binary 0 pulse delivered by NAND gate 84 causes the resetting of the flip-flops 25 and 29.

The signal at tap 85 of delay line 82 next falls to the binary 0 level and this trailing edge causes the setting of flip-flop 75.

The Q output terminal of flip-flop 75 is connected to the input of an inverter/driver 87, which is of the "open collector" type.

Therefore, when flip-flop 75 is set, the output terminal of the inverter/driver 87 becomes grounded and falls to the binary 0 level. This output signal is applied to lead 21, whereby the signal PROCOL present on lead 21 is brought to the binary 0 level. This PROCOL signal then propagates to memory unit 4 to denote that the processor whose request has been accepted, actually has accessed the memory. This PROCOL signal thereby starts a memory cycle and also resets flip-flop 43 of memory unit 4.

Thus, the interface circuits on the memory unit side of the interface are reset to their initial state not with a pulse generated on the memory unit side with a preestablished delay, as proposed in a preferred embodiment of the above-cited patent application, but as a consequence of a pulse generated by the processor and transferred to the memory through an auxiliary lead (namely lead 21). This resetting occurs with a delay depending on the length of the connection, and this can be minimized in accordance with the length of the connection and the related propagation delays.

Although in the instant embodiment, flip-flop 38 (FIG. 1b) is not reset by the pulse transmitted on lead 21, this flip-flop can be reset by means of such pulse.

This is not done so in the instant embodiment because the instant embodiment is particularly directed to a dialogue intended to initiate a memory cycle due to an access request.

Following such dialogue the memory will be busy for a duration relatively long compared to the duration of the immediately-preceding dialogue.

By delaying the resetting of flip-flop 38 until the end of the memory cycle, it is possible to take into account all of the requests for access generated during such memory cycle. Should a lower priority request be accepted too early, i.e. before the conclusion of the memory cycle being executed, any additional requests having higher priority but generated later in the memory cycle might be masked.

Although not shown in detail, processors 2,N also include circuit elements equivalent to those described for processor 1. For a better understanding of the subject invention, the operation of the system as an entity will now be described, with reference to the timing diagram of FIG. 2.

Figure 2:
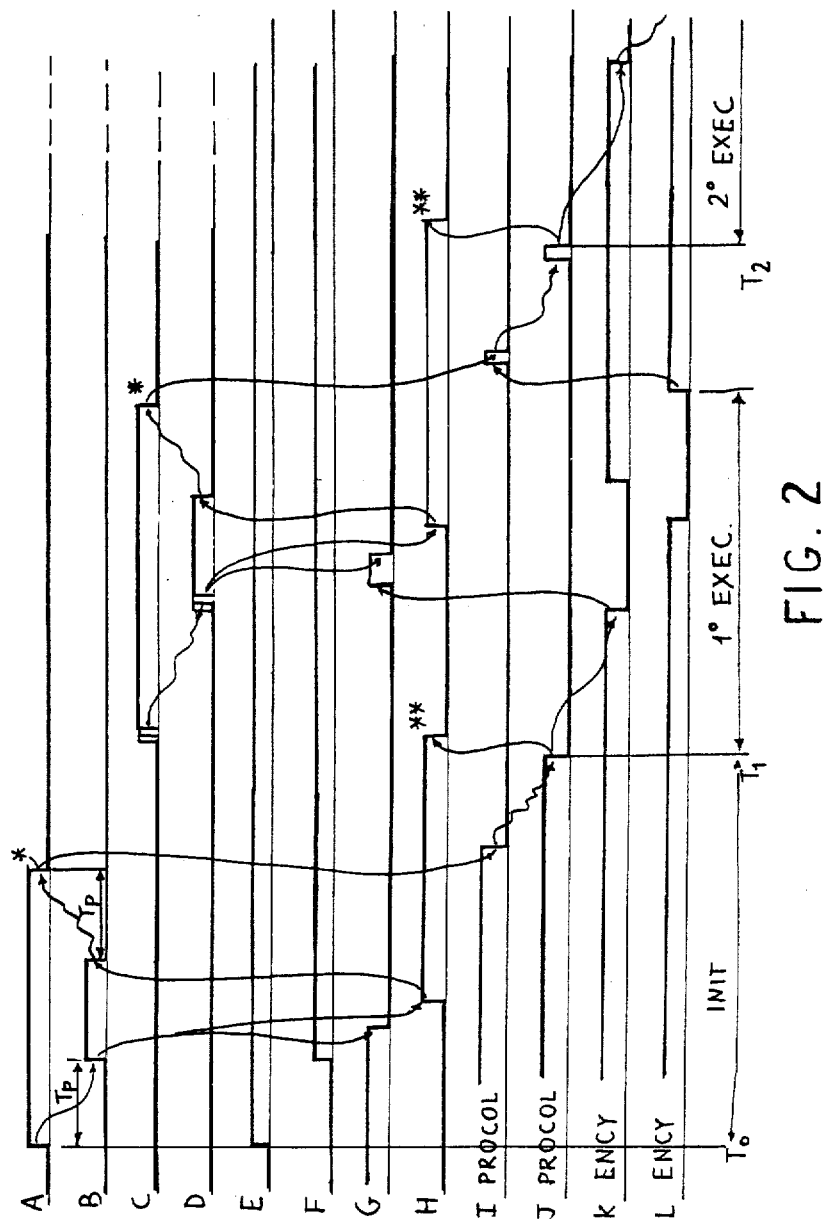
FIG. 2 is a timing diagram of the signals present at various points in the system of FIGS. 1a and 1b.

FIG. 2 illustrates the binary levels of waveforms A-L of signals present at various points in the circuits shown in FIGS. 1a and 1b, which points are referenced by the corresponding letters.

The relational arrows between the waveforms show the interdependence of the various signals. Assume initially that no dialogue is being exchanged between any processor and the memory. Next, assume that, at time $T_o$, processor 1 makes a memory access request.

The microcommand signal MC is generated and sets flip-flop 25.

The signal, waveform A, present at point A of lead 11 thereupon rises to the binary 1 level.

The leading edge of this signal, representing an access request, propagates along lead 11, reaching point B with a delay time of $T_p$, waveform B, corresponding to the propagation time of lead 11.

This leading edge of waveform B causes a corresponding signal to be applied to delay line 39 and triggers the loading of register 34. After a short delay flip-flop 38 is set, causing the signal present on lead 37, waveform G, to fall to the binary 0 level. As a consequence, AND gate 36 is disabled. A representation of the access request submitted on lead 11, is now stored in register 34.

The leading edge of the signal propagating along delay line 39 next causes the setting of flip-flop 43 whereupon the signal on lead 44 rises to the binary 1 level, waveform H.

As a consequence, the NAND gates 45, 46 and 47 become enabled and the access request representation already stored in register 34 causes the output signal of NAND gate 45 to fall to the binary 0 level. As a consequence, point B of lead 11 is returned to the binary 0 level. This pulse trailing edge propagates along the lead 11, reaching point A after a time of $T_p$, waveform A. This trailing edge causes the setting of the flip-flop 29 and, consequently, of flip-flop 74. The signal applied to delay line 82 thereupon falls to the binary 0 level, providing signals for resetting flip-flops 25 and 29 and for setting flip-flop 75.

The setting of flip-flop 75 causes the signal present at point I of lead 21 to fall to the binary 0 level, waveform I.

The asterisk in waveform A shows the instant when the interface circuits associated with lead 11 (flip-flops 25 and 29) are reset to their initial states.

The binary level drop in the signal on lead 21 propagates from point I to the point J with a delay time $T_p$, waveform, and is received by the memory unit, causing the resetting of flip-flop 43 and the activation of a memory cycle.

Therefore the signal on lead 44 falls to the binary 0 level, waveform H.

The asterisk pairs in waveform H show the instant when the interface circuits on the memory side of lead 11 (flip-flop 43) are reset.

When lead 44 falls to the binary 0 level, the preliminary dialogue, performed on the lead 11 to request memory access for processor 1, shown as the INIT phase in FIG. 2, virtually comes to an end. From this moment ($T_1$) on, the memory access operation actually begins with the initiation of the corresponding cycle, shown as the 1st EXEC phase in FIG. 2.

Note that during the preliminary phase INIT, in which request by and allocation of access to processor 1 occurs, access requests by other processors may be made, concurrently or later.

An example of this situation is shown in waveforms C, D, E and F, which show the signal binary levels present at the corresponding points of leads 12 and 13. For example, at time $T_o$, processor N transmits a memory access request signal on the lead 13, concurrently with the request signal of processor 1, waveforms E and F. Although this request signal is transferred through receiver/inverter 33 and a representation thereof is loaded in register 34, it is not then acknowledged nor accepted because the priority network 48 accords priority to the request of processor 1 over the request of processor N.

In the same example at a later time $T_1$, processor 2 also transmits a memory access request signal, on lead 12, waveforms C and D. This request signal is not immediately acknowledged nor accepted because memory access has already been granted to processor 1, and the memory cycle assigned to processor 1 is still in execution. However, the request from the processor 2 is acknowledged and accorded priority over the request by the processor N as soon as flip-flop 38 is reset, waveform G, raising to the binary 1 level the related signal on lead 37.

Toward the end of the memory cycle initiated in response to the request of the processor 1 the storage block 57 causes the signal ENCY present at the point K to fall to the binary 0 level.

Concurrently flip-flop 38 is reset and the signal on lead 37 rises to the binary 1 level, waveform G. The access request then pending on lead 12 is thereupon acknowledged and accepted, being accorded priority over the request pending on lead 13. This action causes the setting of flip-flops 38 and 43, and the loading of register 34, waveforms G and H. However, although memory unit 4 accepts this request submitted by processor 2, and the flip-flop of processor 2 which corresponds to flip-flop 29 of processor 1 is thereupon set, a corresponding memory cycle is not necessarily initiated at once. In fact, in the instant example the memory cycle previously initiated is still in execution, and the signal PROCOL on the lead 21 continues at the binary 0 level due to the set state of flip-flop 75. Under these conditions the flip-flop of processor 2 which corresponds to flip-flop 29 of processor 1 is unable to send an output signal through its NAND circuit which corresponds to NAND gate 66 of processor 1, because such NAND gate is disabled by the binary 0 level of the signal on lead 21. Only at tap the memory cycle is effectively concluded, does memory unit 4 cause the signal ENCY on lead 22 to rise to the binary 1 level. When binary 1 level signal arrives at point L, waveform L, flip-flop 75 of processor 1 is reset by the pulse generated by OR gate 77, inverter 79, and delay line 78. Therefore the signal on lead 21 rises again to the binary 1 level.

Immediately thereafter, due to now enabled NAND gate of processor 2 which corresponds to NAND gate 66 of the processor 1, the flip-flops of processor 2 which correspond to flip-flops 74 and 75 of the processor 1, are set and, therefore, lead 21 returns to the binary 0 level.

A new memory cycle now begins, this time assigned to processor 2. In this second case the initial phase of acknowledgment and acceptance of the access request virtually overlaps the memory cycle previously initiated, except for the signal propagation time along lead 21, waveforms I-J. It is not advisable to always recover this propagation time (for example by anticipating the rise of the signal ENCY with respect to the actual conclusion of the memory cycle), because this propagation time varies as a function of the length of the connection between the processors and the memory.

The above description points out the possibility of an interlocked, bidirectional dialogue on a single lead (for example lead 11) exploiting two signal transitions, the interface circuits at one end of the lead being reset by means of a signal sent along an auxiliary lead (lead 21). Such auxiliary lead is not necessarily an additional lead; in fact, it can be made available for other purposes than the resetting of some interface circuits. However, even if this were not so, substantial savings can be achieved in the frequent case of several units communicating with another unit in an autonomous way. In fact, in the case of several bidirectional star connections, a single auxiliary wire, connected in daisy chain mode to the various units is sufficient to obtain the required resetting action. The described form of embodiment is significantly convenient for the achievement of a system for the access to a memory by several processors competing with each other for such access, as shown by the preceding description and attached drawings.

For a more exhaustive description, described below are the code numbers and the manufacturers of some of the circuit elements represented in FIGS. 1a and 1b, and usually available in the form of integrated circuits. The manufacturers' manuals provide all the necessary information useful for their utilization, in addition to that provided in the preceding description.

---

Flip-flop 25, 29, 74, 38, 43:
    Code = 74S112   Manufacturer: Texas Instruments
Register 34
    Code = 74S195   Manufacturer: Texas Instruments
Inverter/receivers 71, 68, 27, 54, 31, 32, 33
    Code = 26S10   Manufacturer: AMD
Inverter/drivers 26, 87, 65
    Code = 26S10   Manufacturer: AMD
NAND/drivers 45, 46, 47
    Code = 26S10   Manufacturer: AMD

---

The other elements are common circuits, such as the AND, OR and NAND gates, etc., and no additional information is required for those.

Obviously the above description only refers to a preferred form of embodiment of the subject invention, and many changes can be made to the circuit shown herein and to the components used, without departing from the scope of the invention. In particular, as outlined in the above-cited patent application, the transmission system of the subject invention can also be used for optical-type connections, where the electrical signals, or part thereof, transferred through the interface, are electromagnetic radiations.

We claim:

1. In a digital data processing system comprising first and second units of a data processing system, wherein the units communicate with each other by transferring data over communication lines linking together the two units and wherein when communication of data between the units is to occur, said first unit generates a communication initiation signal; an improved interface circuit for providing a dialogue between said units to control communication between said units, comprising in combination:

first and second communication lines extending between said two units;

first and second line drivers disposed respectively in said first and second units, each of said line drivers having an input terminal and an output terminal, the output terminal of each of said line drivers being coupled to a respective end of said first communication line to provide that said first communication line assumes a first binary state when both of said line drivers deliver on the output terminals thereof signals representing the same one of a binary state and assumes a second binary state when either one of said signals delivered by said line drivers does not represent said one binary state;

first and second bistable elements disposed respectively in said first and second units;

means for coupling said first bistable element to said first line driver to supply a signal to the input terminal of said first line driver representative of the binary state of said first bistable element;

means for coupling said second bistable element to said second line driver to supply a signal to the input terminal of said second line driver representative of the binary state of said second bistable element;

said first and second bistable elements in the initial mode of said interface circuit operating in respective first and second predetermined binary states to cause said first driver to deliver a signal which does not represent said one binary state and said second line driver to deliver a signal which represents said one binary state;

first and second detecting means disposed respectively in said first and second units, each of said detecting means being coupled to sense the binary state of said first communication line and to generate an output signal representing the binary state sensed thereby;

means for applying said communication initiation signal to said first bistable element to transfer said first bistable element from said first predetermined binary state to the other binary state when said communication initiation signal occurs, to represent a request by said first unit to communicate with said second unit;

said second detecting means being coupled to said second bistable element to provide for the output signal of said second detecting means to transfer said second bistable element from said second predetermined binary state to the other binary state when the binary state of said first communication line changes from said second binary state to said first binary state, to represent acknowledgment of the receipt by said second unit of said request to communicate;

said first bistable element being coupled to receive a first kind output signal generated by said first detecting means when said first communication line changes from said first binary state to said second binary state, said first bistable element changing from said other binary state thereof to said first predetermined binary state upon the occurrence of said first kind output signal;

a third line driver disposed in said first unit, said third line driver having an input terminal and an output terminal, the output terminal of said third line driver being coupled to one end of said second communication line, said third line driver being coupled to receive said first kind output signal and responsive to said first kind output signal to cause said second communication line to assume a first binary state thereof for initiating the communication requested by said first unit; and a third detecting means disposed in said second unit, said third detecting means being coupled to sense the binary state of said second communication line and to generate an output signal representing the binary state sensed thereby, said third detecting means being coupled to said second bistable element to provide for the output signal of said third detecting means to transfer said second bistable element from said other binary state thereof to said second predetermined binary state when said communication line changes to said first binary state thereof.

2. the circuit of claim 1, further comprising:

a third communication line extending between said two units;

a fourth line driver disposed in said second unit, said fourth line driver having an input terminal and an output terminal, the output terminal of said fourth line driver being coupled to one end of said third communication line, said fourth line driver applying to said third communication line a signal representing the interval during which said communication requested by said first unit is being carried out; and a fourth detecting means disposed in said first unit, said fourth detecting means being coupled to sense the binary state of sense third communication line and to generate an output signal representing the binary state sensed thereby, said fourth detecting means being coupled to said third line driver to provide for the output signal of said fourth detecting means to control said third line driver to cause said second communication line to assume a second binary state thereof to complete said communication requested by said first unit.

* * * * *